United States Patent [19]

Kawasaki et al.

[11] 4,152,976
[45] May 8, 1979

[54] AUTOMATIC WEIGHING AND DISTRIBUTING APPARATUS FOR TOPPING SLICED CHEESE, ETC. ON PIE CRUSTS

[75] Inventors: Koichiro Kawasaki, Tanashi; Kazushige Okada, Matsudo; Yutaka Suginaka; Tokuichi Adachi, both of Higashimuragama; Akira Shirasu, Yokohama, all of Japan

[73] Assignee: Meiji Nyugyo Kabushiki Kaisha, Tokyo, Japan

[21] Appl. No.: 811,443

[22] Filed: Jun. 29, 1977

[30] Foreign Application Priority Data

Jul. 2, 1976 [JP] Japan .......................... 51/87612[U]

[51] Int. Cl.² .............................................. A21C 9/04
[52] U.S. Cl. ...................................... 99/450.1; 99/494; 198/505; 198/466; 426/292
[58] Field of Search ................ 99/355, 450.1, 450.6, 99/494; 118/13, 15, 25; 222/56; 141/83; 198/466, 505; 426/96, 273, 289, 292

[56] References Cited

U.S. PATENT DOCUMENTS

| | | | |
|---|---|---|---|
| 3,358,618 | 12/1967 | Vetta | 99/450.1 |
| 3,648,596 | 3/1972 | Zito | 99/494 |
| 3,662,677 | 5/1972 | Westling | 99/450.1 |

*Primary Examiner*—Harvey C. Hornsby
*Assistant Examiner*—Timothy Simone
*Attorney, Agent, or Firm*—Wenderoth, Lind & Ponack

[57] ABSTRACT

An apparatus for topping a succession of regularly spaced pizzapie crusts on a conveyer with sliced topping material, such as cheese, comprising slicing means to cut blocks of the material on the conveyer into slices of appropriate shapes and sizes, and an automatic weighing means to supply appropriate amounts of the sliced material to the pizzapie crusts. The apparatus further includes an electrical control means which controls the operations of the above-mentioned means so that the operations will have a timed relationship with the movement of the pizzapie crusts, thereby placing each amount of sliced material on top of the corresponding pie crust with accuracy and without loss.

10 Claims, 6 Drawing Figures

AUTOMATIC WEIGHING AND DISTRIBUTING APPARATUS FOR TOPPING SLICED CHEESE, ETC. ON PIE CRUSTS

BACKGROUND OF THE INVENTION

1. Field of the Invention

The present invention relates generally to an apparatus for topping pizzapie crusts with sliced cheese, and more particularly to a novel and improved automatic apparatus which comprises operatively associated means for cutting blocks of topping cheese and the like into slices of appropriate shapes and sizes, for weighing the slices to supply appropriate amounts of slices and for distributing each amount of slices onto the top of a succession of regularly spaced pie crusts on a conveyer. The operations have a timed relationship with the movement of the pie crusts so that every amount of slices can be distributed over the pie crust with accuracy and uniformity and without the necessity of recovering improperly distributed slices.

2. Description of the Prior Art

According to a conventional apparatus for topping pizzapie crusts with slices of cheese, etc., a conveyer is provided which carries a continuous flow of slices of cheese and the like, and a continuous conveyer travels below the first-mentioned conveyer, carrying a succession of regularly spaced pizzapie crusts. A flow of sliced cheese is made to fall over each traveling pie crust like in a waterfall at the end of the first-mentioned conveyer. In the above conventional apparatus, a flow of sliced cheese travels on the conveyer with a thin layer of sliced cheese transversely covering the width of the conveyer and with the timed relationship with the movement of a succession of pizzapie crusts traveling at a constant speed. The above apparatus has disadvantages from the economical aspect and from the necessity of recollecting or regathering the portions of the slices not overlying the pie crusts, or placed otherwise than the surfaces of the crusts to return the same to the conveyer for recycling. As noted above, during the recycling of those portions the quality of the cheese will be lowered or aggravated to a marked degree, while slices of cheese are very unevenly distributed over the surface of the pie crust. Another conventional apparatus comprises a rotary sliced cheese supplier and a continuous conveyer carrying regularly spaced pie crusts thereon. The sliced cheese supplier has a plurality of sections regularly spaced on the periphery thereof and separated from each other by means of stationary pins. This supplier rotates on its axis in a synchronized relationship with the movement of the pie crusts on the conveyer so that each of the sections corresponds to each of the crusts when the former is positioned immediately above the conveyer which travels below the supplier. Each section has a plurality of movable pins which are operated for movement up and down by means of a cam. A continuous flow of sliced cheese is fed to a rotating supplier so that a given amount of sliced cheese is allotted to each section, the excess of the sliced cheese being eliminated by means of compressed air so that a given thickness of sliced cheese can be fed to each section. A guide is provided over several sections and extends circumferentially to the position immediately above the conveyer. Then, each of the sections of the supplier which carries a charge of sliced cheese therein with movable pins raised rotates along the guide to the above-mentioned discharge position, and the sliced cheese falls by gravity over the pie crust. The section which has gone past the position is cleared of the remaining cheese slices adhered thereto by means of a stationary knife which contacts the surface of the section with the movable pins lowered by the cam. However, the apparatus is disadvantageous particularly because of its uneven distribution of sliced cheese over the crust and easy adhesiveness of the cheese slices to the surfaces of contact.

In addition, problems which are common to the two conventional apparatuses cited above should be noted in relation to the kind or type of topping or garnishing sliced edible materials used, such as cheese. In other words, cheese readily softens at elevated temperatures, and it is therefore necessary to maintain the operating temperature at about 0° C.

SUMMARY OF THE INVENTION

In light of the disadvantages and problems of the prior art cited above, it is therefore one object of the present invention to provide a novel and improved apparatus for topping a succession of regularly spaced pizzapie crusts on conveyer with given amounts of sliced cheese or other similar sliced edible topping substances.

Another object of the present invention is to provide an improved apparatus which comprises a slicing device for cutting blocks of cheese, etc. to slices of desired sizes and shapes; an automatic weighing device for supplying appropriate amounts of sliced cheese; and a distributing device for distributing the amounts of sliced cheese on top of a succession of pizzapie crusts on conveyer. The above-mentioned devices are operatively associated with each other so that all of the operations are performed automatically and economically.

Still another object of the present invention is to eliminate the unnecessary recycling of those portions of the already distributed sliced cheese lying outside the pie crusts by placing all allotted slices over the surfaces of the pie crusts with certainty and without loss.

A further object of the present invention is to distribute every allotted amount of sliced cheese over each pie crust evenly and uniformly.

A still further object of the present invention is to provide an improved apparatus which includes an automatic speed control circuit operative for changing the rate of feeding a charge of sliced cheese from high to low and eventually to an automatic stop depending on the proportions of the charge to be fed.

The advantages and features of the apparatus constructed according to the present invention provide for the apparatus to operate at ambient temperatures of about 15° C. or more as well as at 0° C., and for the automatic alotting of amounts of sliced cheese and evenly distributing the cheese over the entire surfaces of a procession of regularly spaced pizzapie crusts without loss or without escaping of the cheese away from the crusts, thereby eliminating the necessity of recollecting those portions of the distributed slices which have escaped outside the crust for the purpose of recycling use and thus maintaining the nature of cheese in a constant good quality.

BRIEF DESCRIPTION OF THE DRAWINGS

Other objects and advantages of the present invention will become apparent from the description of the specification which follows hereinafter and the appended claims by reference to the accompanying drawings in which:

DESCRIPTION OF THE PREFERRED EMBODIMENTS

Figure 1:
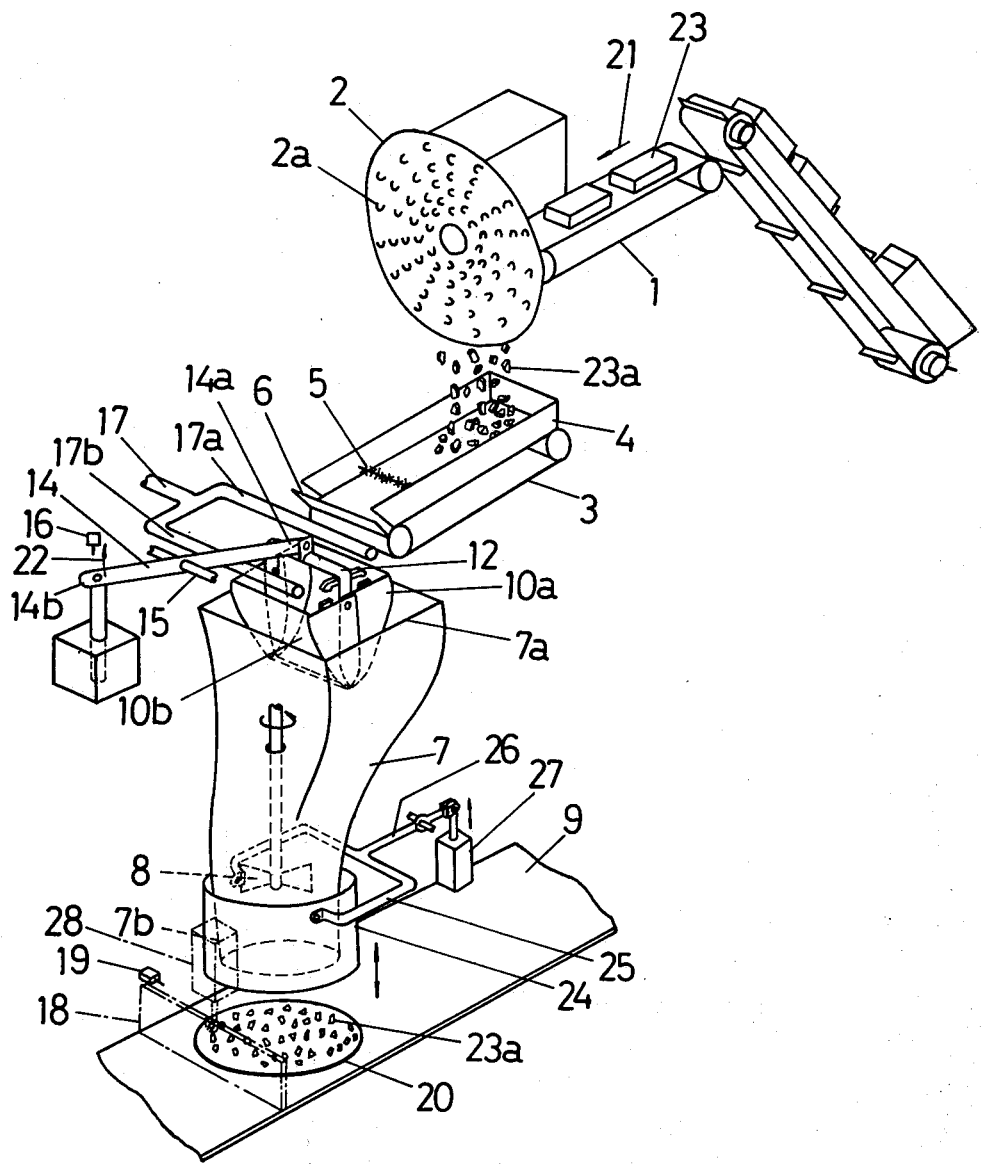
FIG. 1 is a perspective view of a preferred embodiment of the apparatus according to the present invention.
Figure 2:
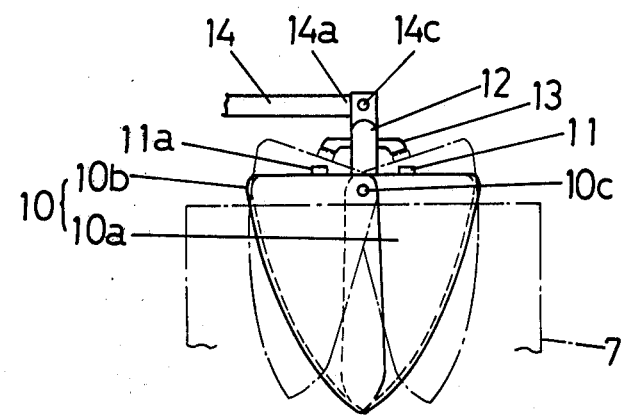
FIG. 2 is an enlarged front view of an automatic weighing and allotting device forming an essential part of the invention.

The present invention will further be illustrated by way of several preferred embodiments by referring to the accompanying drawings. An intermittently driven conveyer 1 is provided which carries a succession of blocks of edible topping material 23 such as for example cheese (hereinafter referred to as cheese for simplicity and clarity of understanding). At one end of the conveyer 1 is a slicing device or cutter 2 rotating continuously at a constant rate and which has the form of a round plate having a plurality of protruded cutters 2a thereon opposite the conveyer 1. More specifically, the slicing device 2 has its protruded cutter surface 2a located opposite one end of the conveyer 1 at right angles to the direction of the conveyer 1 and has the upper half of its surface located above the level of the conveyer 1. Below the slicing device 2 is a further intermittent sloping downward conveyer 3 with one end located immediately below the slicing device 2. The conveyer 3 has a frame member 4 extending on the opposite sides and the inlet end thereof for preventing the sliced cheese 23a from escaping the conveyer 3. The frame member 4 has a feather-equipped rotary shaft 5 traversing the conveyer 3 and rotatably connected to the opposite sides there of. At the other end of the conveyer 3 is a pivotally movable shutter member 6 which is solenoid-operated (not shown). The conveyer 1 and the conveyer 3 are intermittently driven and controlled by an electrical control circuit to be described later so that the two conveyers 1 and 3 can move and stop simultaneously. Below the conveyer 3 is a vertical cylindrical distributor casing 7 having at the upper end thereof an opening 7a of substantially rectangular shape opposite the outlet end of the conveyer 3 and at the other bottom end an opening 7b of rounded shape. As shown in FIG. 1, the casing 7 is shaped such that it has the cross-sectional area gradually decreasing toward the lower open rounded end 7b which has a cross-sectional area slightly smaller than that of a pie crust 20 to be topped. The casing 7 has a rotary vertical shaft equipped with stirring blades 8. This shaft is located at a central position inside the casing 7 and continuously rotates at constant speed. As noted, the lower open end 7b of the casing 7 is located opposite a conveyer 9 which carries a succession of regularly spaced pizzapie crusts 20 thereon. The casing 7 is also equipped with a movable annular guide ring 24 which is solenoid-operated for movement up and down. In more detail, the guide ring 24 is rigidly held by two arms 25 which are connected to a lever 26 which is operated by a solenoid 27 for movement up and down. In FIGS. 1 and 2, a weighing device generally designated by 10 is provided inside the casing 7 at the upper opening 7a thereof and is located immediately below the outlet end of the conveyer 3. As particularly shown in FIG. 2, the weighing device 10 consists essentially of a bucket-shape vessel having two separate parts 10a and 10b hinged togehter at one as shown at 10c and which engage each other at the other end. As shown, the vessel is open at top, and is openably closed at bottom to form a box. The parts 10a and 10b have ferromagnetic elements 11 and 11a on the respective upper edges thereof and are supported in suspension by a two-arm support member 12 which is hinged at 10c to the parts 10a and 10b. The support member 12 has an electromagnetically-energized bar 13 whose ends are located opposite the corresponding parts 10a and 10b. Thus, electrical signals from an electric circuit, which will be described later, are fed to the electromagnet bar 13, which is then energized for magnetically attracting the ferromagnetic elements 11 and 11a on the parts 10a and 10b thereto and magnetically attaching the elements 11 and 11b, thereby urging the parts 10a and 10b hinged at 10c to rotate and cause the lower ends of the parts 10a and 10b to move outwardly and open at the bottom. Pivotally connected at 14c to the other end of the support member 12 is one end 14a of a rockable rod member 14 which is rockably carried by a support member 15 fitted therein at the mid-position as shown in FIG. 1. Thus, the rod member 14 can pivot on the support member 15 for swinging movement. An electrical switch 16 is located near the outer end 14b of the rockable rod member 14. The switch 16 has a contact point which is depressed by the end 14b of the rod member 14 for completing the switch circuit 16. As readily understood, the switch 16 is actuated when the contact point is depressed by the end 14b of the rockable rod member 14 which swings on the pivot 15 in the direction shown by arrow 22 when the weighing device 10 is lowered through the opening 7a of the casing 7 by the weight of an amount of sliced cheese 23a fed from the conveyer 3. A pneumatic air nozzle supply pipe 17 is located above the weighing device 10 and has two branches 17a and 17b. The air nozzle pipe 17 supplies a blow of air from the nozzles of the branches 17a and 17b into the area between the bucket-shaped parts 10a and 10b in order to prevent adhesion of sliced material 23a to the inner side walls of the parts 10a and 10b and thus aids in making the material 23a fall without difficulty.

Figure 3:
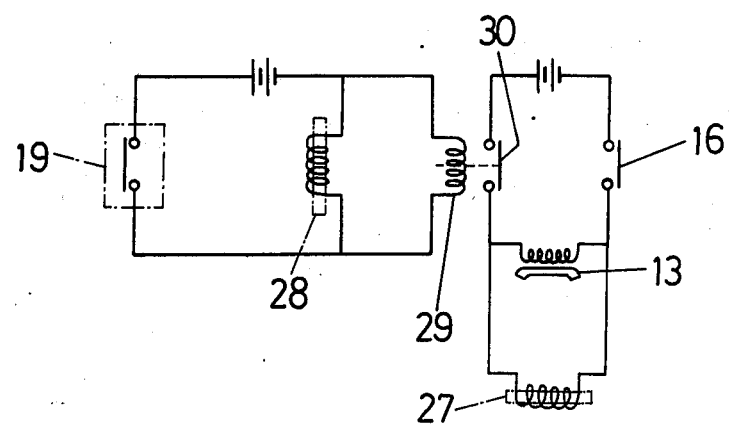
FIG. 3 is a circuit diagram of an example of an electrical circuit.

In FIG. 1, a vertical stopper plate 18 is provided across the conveyer 9 for movement close to and away from the conveyer 9, and a micro-switch 19 is located near the passage of the conveyer 9. The micro switch 19 is actuated when a pizzapie crust 20 on the conveyer 9 is placed immediately below the lower open end 7b of the casing 7 so that it can close the circuit for bringing the stopper plate 18 down, thereby, arresting the crust 20 in position immediately below the open end 7b from forward movement. As particularly shown in FIGS. 1 and 3, the stopper plate 18 is operated by an electromagnetically actuated solenoid, which in turn is controlled by the switch 19. The location of the switch 19 is such that the switch is actuated when a pie crust 20 is placed immediately below the open end 7b, and it simultaneously actuates the solenoid 7b to move the stopper plate 18 down. In further detail, in connection with the solenoid-operated guide ring 24, the switch circuit 19 cooperates with the switch circuit 16 which in turn is actuated by the swinging movement of the rod member 14 so that, as shown in FIG. 3, since both circuits 19 and 16 are almost simultaneously closed, current from power source flows through the solenoid coil 28 and a further coil 29, thus actuating the solenoid 28 to move the stopper plate 18 and also actuating the coil to attract a switch 30, such as a reed switch, while a current from the power source flows through the electromagnetic coil assembly 13 and solenoid coil 27, thus actuating both the weighing device 10 and the guide ring 24, which moves down to cover the crust 20 in position.

In accordance with the apparatus constructed as illustrated heretofore, blocks of cheese 23 shaped to appropriate sizes carried by the conveyer 1 move in the arrow direction 21 in an intermittent manner which has the timed relationship with the conveyer 3, as described earlier, while the slicing device 2 is rotating. The slicing device 20 cuts or slices a block or blocks of cheese 23 to appropriate shapes and sizes by means of its protruded cutters 2a, thus providing slices of cheese 23a which fall to the inclined conveyer 3. The cheese slices 23a travel down onto the intermittently-driven conveyer 3 and are then fed to the weighing device 10. The slices 23a are maintained at a constant thickness by means of the rotary feathered shaft 5. The conveyer 3 is controlled by an automatic speed control circuit (FIG. 4) which will be described later so that it can move at high speed until about 50 to 90% by weight of the charge of sliced cheese 23a have been discharged to the weighing device 10 while it can move at low speed for the remaining amount of the charge equal to about 50 to 10% by weight. The conveyer 3 comes to a stop when the switch 16 is closed. Then, the weighing device 10 is lowered by the weight of the charge of sliced cheese 23a fed thereto, causing the rockable rod member 14 supporting the device 10 in suspension to swing on the pivot member 15 thus raising the end 14b of the member 14 closer to the switch 16 for depressing the switch contact and closing the switch circuit 16. In the meantime, a pizzapie crust 20 is moving on the conveyer 9 toward the position immediately below the lower open end 7b. When the crust 20 reaches that position, the microswitch 19 senses the location of the crust 20 and is actuated to close the circuit so that it can energize the solenoid coil 28 to move the stopper plate 18 down to block the pizzapie crust 20 in position while current flows into a coil 29 which attracts the switch 30 for closing. Then, the switch circuits 16 and 19 are completed to energize the electromagnet coil assembly 13 so that the ferromagnetic elements 11 and 11a on the upper edges of the bucket parts 10a and 10b can magnetically be attracted to the electromagnet 13, thus turning the buckets 10a and 10b on the pivot 10c and causing the lower ends thereof to open wider. As described above, the air supply pipe 17 delivers a blow of air from its branched pipes 17a and 17b which accelerates the fall of the charge of sliced cheese 23a through the casing 7. While the slices 23a are falling, they are stirred by means of the rotary stirrer blades 8 and are delivered through the lower open end 7b of the casing 7 uniformly over the surface of a crust 20 which is arrested by the stopper plate 18 and remains stationary. In the meantime, the guide ring 24 is operated by the solenoid coil 27 which is energized by the switch circuit 16 actuated by the rod member 14, so that the ring 24 can be lowered to cover the crust 20, thereby preventing escape of the distributed slices 23a. When the delivery of the charge of sliced cheese 23a is completed and the switch circuit 16, opened the guide ring 24 is again raised away from the conveyer passage 9 and is ready for a next crust 20.

Figure 4:
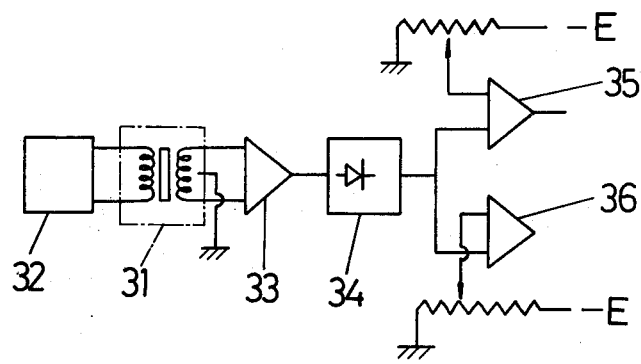
FIG. 4 is a block diagram of the automatic speed control circuit.

FIG. 4 indicates a block diagram of the automatic speed control circuit earlier mentioned which controls the speed or rate of feeding a charge of sliced cheese 23a from the conveyer 3 to the weighing device 10. In the circuit of FIG. 4 a differential transformer 31 is shown which replaces the switch 16 in FIG. 1. As particularly indicated in FIG. 4, a signal generator 32 delivers constant a.e. output signals which are supplied to the above differential transformer 31. The differential transformer 31 consists of a primary coil, a secondary coil and a core between the two coils, and controls the input signals to induce varying control output signals in the following manner. The constant a.e. output signals of the signal generator 32 vary in magnitude or level with the movement of the core which is moved by the rod member 14, so that signals of varying value develop at the secondary coil of the transformer 31. The output signals of the transformer 31 are then amplified by an amplifier 33 which supplies amplified output signals which then go to a rectifier 34 which converts the a.c. signals to d.c. signals. The conveyer 3 travels at a high speed until about 50 to 90% by weight of a charge of sliced cheese 23a has been supplied to the weighing device 10, then the core of the transformer 31 operatively associated with the rod member 14 is moved so that the transformer 31 can produce output signals of a given level which are fed through amplifier 33 and rectifier 34 to the comparators 35 or 36 which compare the signals with reference signals. In this case, the comparator 35 is actuated for changing the supply speed from high to low. While the remaining 50 to 10% by weight of the charge is being supplied, a further displacement of the core causes the transformer 31 to produce output signals of a different given level which, in this case, actute the comparator 36 for stopping the conveyer 3. The circuit of FIG. 4, including the transformer 31 has been described, but it may include the switch 16 which is constructed to function similarly to the transformer 31.

Figure 5:
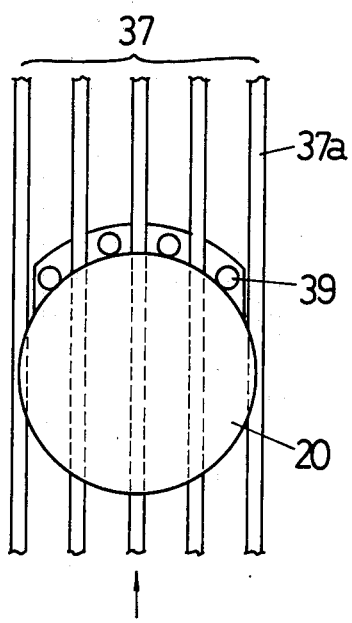
FIG. 5 is a plan view showing a variation of the stopper member in FIG. 1 which restricts movement of a pie crest in position on conveyer.
Figure 6:
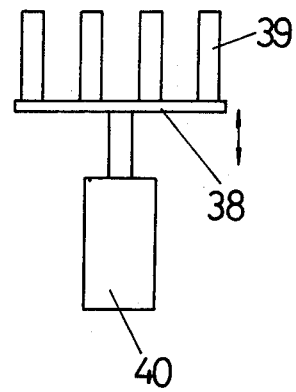
FIG. 6 is a front view of FIG. 5.

FIGS. 5 and 6 indicate a varied form of the conveyer 9 in FIG. 1, in which the conveyer generally designated by 37 consists of a plurality of parallelly spaced rope belts 37a, etc. of smaller width running along the length of the conveyer passage. By this construction of the conveyer 37, it is possible to place the microswitch 19 in FIG. 1 upstream of the conveyer passage and adjacent to the passage. More specifically, the location of the microswitch 19 is such that it can sense the presence of a crust 20 before it and can then be actuated for moving up a different stopper, later to be described, before the crust 20 passes the switch 19 and has been placed in a topping position. This can arrest a pie crust 20 in that position by the stopper with certainty and without delay. The stopper plate 18 in FIG. 1 is replaced by the second stopper 38 in FIGS. 5 and 6, which is located below the conveyer passage 37 and is also solenoid-operated as in FIG. 1. As particularly shown, the stopper 38 consists of a plurality of parallel spaced rods 39, etc. which are capable of movement up and down through the corresponding gaps between the adjacent rope belts 37a, etc. As shown in FIG. 5, the rods 37a, etc. have the semi-circular arrangement which substantially corresponds to the round peripheral shape of a pie crust, and can fit the peripheral edge of the crust. As described, the stopper 38 is operated by a solenoid 40, and because the micro-switch 19 is actuated by sensing the presence of a crust as it passes it, the circuit is closed to energize the solenoid coil 40 to move the stopper 38 up through the gaps and then arrest the crust 20 by its protruded rods 39, etc. The sliced cheese topping operations are performed in the above-described manner, and after completion of the operations for one crust, at which time the switch 19 has turned off, the stopper 39 moves down for allowing the crust 20 to be released therefrom and moved forward by the belt conveyer 37a. The conveyer 9 in FIG. 1 may have a further modified form not shown in which it can be driven in the intermittent manner. By this construction, it is possible to eliminate the stopper plate 18 in FIG. 1 or stopper 39 in FIGS. 5 and 6. It should be understood that the intermittently-driven conveyer can place a succession of crusts 20 thereon one after another in position immediately below the lower open end 7b of the casing 7 and can automatically stop in that position during the topping operation. The present invention has been described heretofore by referring to the several chosen embodiments and modified forms thereof, and the topping sliced substance on crusts such as cheese has typically been exemplified for clarity and simplity of understanding, (but the substance is not limited to the cheese shown.) Substance materials may be any that can have the character of being cut to sliced pieces. It should also be understood that various changes and modifications of the shown embodiments may be made without departing from the spirit and scope of the invention.

What is claimed is:

1. An apparatus for topping a succession of regularly spaced pizzapie crusts on a conveyer with sliced edible material, said apparatus comprising:
    first conveying means for carrying a succession of blocks of topping material of predetermined shape and size, said first conveying means being driven intermittently;
    slicing means located at the outlet end of said first conveying means and rotatable at constant speeds for cutting each block of topping material into slices of predetermined shapes and sizes, said slicing means having a plurality of protruded cutters on the side thereof opposite said outlet end of said first conveying means and at right angles to the direction of movement of said first conveying means;
    second conveying means located below said slicing means for receiving said sliced materials from said slicing means, said second conveying means being intermittently driven, speed-changeable and operatively associated with said first conveying means;
    rotatable, feather-equipped shaft means across the width of said second conveying means for smoothing said sliced materials to a constant thickness;
    automatic weighing means at the end of and beneath said second conveying means for receiving and weighing the topping material from said second conveying means, said weighing means being electromagnetically operated and comprised of:
        a two-part container hinged together at one end and openable at the other end,
        a ferromagnetic member attached to each container part,
        pivotted support and weighing member means connected to said container for supporting said container and weighing the amount of said material in said container; and
        electromagnetic attracting means on said support and weighing member means for attracting said ferromagnetic members on said container means, whereby when said ferromagnetic members are attracted by said attracting means, container parts pivot at the hinge and the container is opened;
    a vertical casing means open at the top and the bottom, located beneath said two-part container, for directing the fall of material from said container when it is open;
    stirring blade means within said vertical casing means for separating and distributing said material falling through said casing means;
    air supply means at the top of said container for supplying a blast of air against the inside of said container to remove said pieces of said material which might adhere thereto;
    third conveying means located below said casing means for carrying a succession of regularly spaced pie crusts to be topped with said sliced material;
    a solenoid-operated annular guide means movable up and down around the bottom of said casing means selectively closing the space between the bottom of said casing means and said third conveying means;
    stopping means adjacent said third conveying means for stopping a pie crust in position immediately below the bottom opening of said casing means;
    electrically actuated first switch means adjacent said pivotted support and weighing member means, series connected to said electromagnetic attracting means and said annular guide means, and operated by movement of said support and weighing member means for actuating said electromagnetic attracting means and said annular guide means; and
    electrically actuated second switch means adjacent to said third conveying means for sensing the presence of a pie crust and actuating said stopping means to stop said crust in position beneath said casing means.

2. An apparatus as claimed in claim 1, wherein said second conveying means is comprised of:
    a conveyer; and
    electrical speed-change control means connected to said conveyer for controlling the speed of said conveyer, said speed-change control means being comprised of:
        signal generating means for supplying constant a.c. output signals,
        signal control means series connected to said signal generating means for supplying variable a.c. output signals,
        signal amplifying means series connected with said signal control means for supplying amplified a.c. signals,
        rectifying means series connected with said signal amplifying means for supplying d.c. output signals; and
        signal comparator means for comparing said d.c. output signals.

3. An apparatus as claimed in claim 2, wherein said signal comparator means is comprised of:
    two parallelly connected comparators, one comparator being actuated by the a.c. output signals at predetermined levels from said signal control means for changing the speed of said motor-driven conveyer from high to low, and the other comparator being actuated by a.c. output signals of other predetermined levels from said signal control means for halting movement of said conveyer.

4. An apparatus as claimed in claim 1, wherein:
   said third conveying means is comprised of a continuously-driven single band conveyer; and
   said stopping means is comprised of a moveable stopper plate located above and across said third conveying means, said stopper plate being opratively controlled by said electrically-actuated second switch means for movement up and down.

5. An apparatus as claimed in claim 4, wherein said stopper plate is solenoid-operated, said solenoid being controlled by said second switch means.

6. An apparatus as claimed in claim 1, wherein said third conveying means is comprised of an intermittently driven third conveyer controlled by said electrically actuated second switch means for being automatically stopped when a pie crust is placed in said position immediately below the lower open end of said casing means.

7. An apparatus as claimed in claim 1, wherein said electrically actuated second switch means is comprised of a micro-switch located downstream of said third conveying means.

8. An apparatus as defined in claim 1, wherein said third conveying means comprises a plurality of continuously-driven, parallelly-spaced rope belts, and said means to stop a crust in said position comprises a finger-equipped stopper plate located below and across said rope belts, for being actuated by said electrically actuated second means for movement up and down, said stopper plate having a plurality of fingers engageable with said crust through the corresponding gaps between said rope belts.

9. An apparatus as defined in claim 8, wherein said stopper plate is solenoid-operated.

10. An apparatus as defined in claim 1, wherein said electrically actuated first means comprises a micro switch located upstream of said third conveying means.

* * * * *